(12) United States Patent
Damson et al.

(10) Patent No.: US 9,537,426 B2
(45) Date of Patent: Jan. 3, 2017

(54) METHOD AND DEVICE FOR ACTUATING AN INVERTER

(71) Applicant: Robert Bosch GmbH, Stuttgart (DE)

(72) Inventors: Mark Damson, Stuttgart (DE); Thomas Wiecha, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 14/409,512

(22) PCT Filed: Apr. 24, 2013

(86) PCT No.: PCT/EP2013/058492
§ 371 (c)(1),
(2) Date: Dec. 19, 2014

(87) PCT Pub. No.: WO2013/189641
PCT Pub. Date: Dec. 27, 2013

(65) Prior Publication Data
US 2015/0188453 A1    Jul. 2, 2015

(30) Foreign Application Priority Data

Jun. 22, 2012  (DE) .................. 10 2012 210 667

(51) Int. Cl.
| H02P 1/00 | (2006.01) |
| H02P 21/00 | (2016.01) |
| H02P 27/08 | (2006.01) |
| H02M 7/5387 | (2007.01) |
| H02M 7/5395 | (2006.01) |
| H02M 1/00 | (2006.01) |

(52) U.S. Cl.
CPC ....... *H02M 7/53871* (2013.01); *H02M 7/5395* (2013.01); *H02M 7/53875* (2013.01); (Continued)

(58) Field of Classification Search
CPC ................. H02M 2007/53876; H02M 7/5395; H02M 7/527; H02P 27/08; H02P 27/06; H02P 25/22; H02P 27/085; H02P 29/0033; H02P 21/00; H02P 2209/09; H02P 7/29; B60L 2220/58; B60L 2210/42; B60L 3/003; B60L 3/0061; Y10T 307/747; H02H 3/01
See application file for complete search history.

(56) References Cited

U.S. PATENT DOCUMENTS

| 5,631,819 A | 5/1997 | Masaki et al. |
| 7,190,599 B2 | 3/2007 | Virolainen et al. |

(Continued)

FOREIGN PATENT DOCUMENTS

| DE | 102008040144 | 1/2010 |
| JP | 2007252194 | 9/2007 |
| JP | 2011050248 | 3/2011 |

OTHER PUBLICATIONS

International Search Report for Application No. PCT/EP2013/058492 dated Apr. 16, 2014 (English Translation, 2 pages).

*Primary Examiner* — Marlon Fletcher
(74) *Attorney, Agent, or Firm* — Michael Best & Friedrich LLP (57) ABSTRACT

The invention relates to a method for actuating an inverter (10) by means of space vector pulse width modulation, in particular for actuating an electrical machine (14), wherein the inverter (10) has a plurality of controllable switches (S) and is configured to provide a multi-phase electrical voltage (U, V, W) in the form of a voltage space vector (V*), wherein the controllable switches (S) are actuated in such a manner that different duty cycles of the switches (S) are set and a plurality of successive different switching states (V0-V7) of the switches (S) are set up to provide the voltage space vector (V*), wherein the duty cycles of the switches (S) are extended during a pulse width modulation period (T) if a duty cycle of one of the switches (S) falls below a (Continued)

predefined threshold (44) during the pulse width modulation period (T).

15 Claims, 11 Drawing Sheets

(52) U.S. Cl.
CPC ....... *H02P 27/08* (2013.01); *H02M 2001/007* (2013.01); *H02M 2007/53876* (2013.01)

(56) References Cited

U.S. PATENT DOCUMENTS

| | | | |
|---|---|---|---|
| 2003/0173946 A1* | 9/2003 | Liu .................... | G01R 19/0092 324/107 |
| 2007/0216341 A1 | 9/2007 | Gataric et al. | |
| 2008/0094023 A1* | 4/2008 | West ....................... | H02P 27/08 318/811 |
| 2008/0116840 A1* | 5/2008 | Welchko ........... | H02M 7/53875 318/801 |
| 2012/0206077 A1* | 8/2012 | Yoneshima ............. | H02P 6/185 318/400.33 |
| 2015/0032311 A1* | 1/2015 | Shao ....................... | B60L 11/14 701/22 |
| 2015/0131351 A1* | 5/2015 | Hart ...................... | H02M 7/537 363/131 |
| 2015/0236628 A1* | 8/2015 | Wang .................. | H02M 7/5395 318/139 |
| 2016/0094177 A1* | 3/2016 | Shimomugi ...... | H02M 7/53875 318/400.2 |

* cited by examiner

METHOD AND DEVICE FOR ACTUATING AN INVERTER

BACKGROUND OF THE INVENTION

The present invention relates to a method for actuating an inverter by means of a space vector pulse width modulation, in particular for actuating an electrical machine, wherein the inverter has a plurality of controllable switches and is configured to provide a multi-phase electrical voltage in the form of a voltage space vector, wherein the controllable switches are actuated in such a manner that different duty cycles of the switches are set and a plurality of successive different switching states of the switches is set up to provide the voltage space vector.

The present invention relates further to a device for actuating an inverter by means of space vector pulse width modulation, in particular for actuating an electrical machine, wherein the inverter has a plurality of controllable switches which are configured to provide a multi-phase electrical voltage in the form of a voltage space vector, said device comprising a control unit which is designed to actuate the controllable switches in such a manner that different duty cycles of the switches are set and the inverter assumes a plurality of successive different switching states of the switches in order to provide the voltage space vector.

The present invention finally relates to a motor vehicle drive train comprising at least one electrical machine for providing driving power, an inverter for actuating the electrical machine and a device for actuating the inverter of the type described above.

Different actuating methods are known in general in the field of three-phase consumers and in particular in the field of three-phase machines. As a result, the method of space vector modulation is now typically preferred for actuating the three-phase consumer. In these actuating methods, a space vector is formed by successively setting eight base voltage space vectors. In order to provide the phase voltage, the base voltage space vectors are switched in a pulse-width modulated manner so that a corresponding actuating voltage is generated.

Due to limited switching times of the controllable switches of the inverter, the adjustable operating range or the maximum phase control factor of the inverter is limited, i.e. the duration of individual switching pulses of the switches is limited to a minimum length of time. In order to increase the adjustable operating range of the inverter or to be able to set individual operating ranges despite the limited switching times of the controllable switches, the German patent application DE 10 2008 040 144 A1 proposes that the duty cycles of the controllable switches within a pulse width modulation period are in each case shortened by the length of the duty cycle of the switch that is switched on for the shortest amount of time. In so doing, one of the controllable switches is not switched on over the entire pulse width modulation period and the duty cycles of the remaining switches are in each case shortened by the length of the duty cycle of the switch that is switched on for the shortest amount of time. This will result in one of two zero voltage switching states being replaced by another zero voltage switching state.

A disadvantage with this method is that a minimally admissible pulse duration of the switches can be undershot for certain switching sequences or for switching sequences of the controllable switches in which the duty cycles of the two controllable switches that are switched on for the shortest amount of time have a similar duration.

The method mentioned above can furthermore lead to a non-symmetrical, in particular thermal, load on the power semiconductors and to a shift in the average neutral point voltage.

SUMMARY OF THE INVENTION

According to the invention, a method for actuating an inverter by means of space vector pulse modulation of the type mentioned at the beginning of the application is therefore provided, wherein the duty cycles of the switches are extended during a pulse width modulation period if a duty cycle of one of the switches falls below a predefined threshold during the pulse width modulation period.

According to the invention, a device for actuating an inverter of the type mentioned at the beginning of the application is furthermore provided, wherein the control unit is designed for the purpose of extending the duty cycles of the switches during a pulse width modulation period if a duty cycle of one of the switches falls below a predefined threshold during the pulse width modulation period.

Finally, provision is made according to the invention for a motor vehicle drive train comprising at least one electrical machine for providing driving power, an inverter for actuating the electrical machine and a device for actuating the inverter of the type mentioned above.

As a result of the duty cycles of the switches being extended, if in general shorter duty cycles of the switches are set, inadmissibly short pulse durations of the switches can be avoided; thus enabling the adjustable operating range to be expanded. In addition, an asymmetrical, in particular thermal, load on the inverter can thereby be avoided.

The duty cycle of the switch is preferably used, which has a median duty cycle of the switches.

In other words, the duty cycle of the switch is used which has the second longest or second shortest duty cycle or which has neither the longest nor the shortest duty cycle of the switches.

As a result, particularly critical switching sequences of the switches can be detected with simple means, in which sequences inadmissibly short switch-on durations or switch-off durations can occur.

The duty cycles of the switches are preferably extended by a length of time that is identical in each case.

As a result, the voltage space vector provided is not changed, whereby the actuation of the actuated load is, at the same time, not affected.

It is furthermore preferred if the duty cycle of the switch having the longest duty cycle is extended within the pulse width modulation period in such a manner that the switch is switched-on over the entire pulse width modulation period.

In so doing, one of the zero vectors can be omitted during the entire pulse width modulation period, whereby a targeted load distribution in the inverter can be achieved without the actuation of the load being affected.

It is furthermore preferred if the length of time by which the duty cycles of the switches is extended corresponds to the difference between the pulse width modulation period length and the duty cycle of the switch having the longest duty cycle.

This enables the duty cycles to be varied without the voltage space vector being varied and consequently the actuation of the actuated load being impaired.

It is furthermore preferred if the duty cycle of the switch is a duty factor of the switch and the predefined threshold is a duty factor of 50%.

This enables critical actuating sequences, in which the duty cycle of the switches approaches the minimum phase control factor, to be determined using means which are simple in terms of control technology and the actuation of the switches to be adapted accordingly.

It is furthermore preferred if the duty cycles of the switches are shortened if the duty cycle of the switch falls below a second predefined threshold.

As a result, situations can be covered in which the duty cycle of the switches approach the maximum phase control factor and the actuation of the switches is adapted accordingly.

It is thereby furthermore preferred, if the duty cycles of the switches are shortened by a length of time which is identical in each case, that the switch having the shortest duty cycle is open over the entire pulse width modulation period.

As a result, only one of the zero vectors is omitted, whereby the voltage space vector provided and the actuation of the actuated load are not affected.

It is furthermore preferred if the respective switch-on pulses of the switches are shifted within the pulse width modulation period if the duty cycle of the switch corresponds to a predefined value range between the first and the second threshold.

A minimum interval between two switching operations can thus be ensured in a transition region from one actuating situation to another actuating situation, and therefore the switch-on time or the switch-off time of the switches does not exceed the limits of the phase control factor.

It is furthermore preferred if the first and the second threshold are identical.

This enables the transition between the shortening of the duty cycle and the extending of the duty cycle to be formed using simple means.

It is thereby particularly preferred if the switch-on pulses of the switches are shifted to one end of the pulse width modulation period if the duty cycle is changed from a value greater than the first threshold to a value smaller that the first threshold.

As a result, one of the switches can be transitioned to being permanently switched on with simple means.

It is furthermore preferred if the switch-on pulses of the switches are shifted to a beginning of the pulse width modulation period if the duty cycle of the switch is changed from a value smaller than the second threshold to a value greater than the second threshold.

As a result, a transition from a pulse width modulation period in which one of the switches is permanently switched-on to a pulse width modulation period in which one of the switches is permanently switched off can be set, whereby the switch-on durations and the switch-off durations of the switches do not exceed an admissible value.

It is particularly preferred if the switch-on pulses of the switches are shifted in exactly one pulse width modulation period in order to adapt the switch-on pulses to the corresponding preceding pulse width modulation period and the succeeding pulse width modulation period.

It is furthermore preferred if the switch-on pulses of the respective switches are divided and the divided switch-on pulses are shifted in each case to the beginning and the end of the pulse width modulation period.

The pulse width modulation periods can thus respectively begin and end with a zero voltage vector.

As a result, the adjustable operating range can be enlarged by the present invention because switching states having inadmissible switch-on or switch-off durations can be replaced by switching sequences which set an identical voltage space vector. In addition, the inverter can generally be more symmetrically loaded by varying the switch-on durations and in particular by varying the zero voltage switching states or, respectively, the zero vectors.

It goes without saying that features, characteristics and advantages of the method according to the invention can correspondingly be applied to the device according to the invention.

BRIEF DESCRIPTION OF THE DRAWINGS

FIG. 6 shows, in schematic form, the profile of three phase voltages within a pulse width modulation period in which one of the controllable switches is permanently switched on;

DETAILED DESCRIPTION

Figure 1:
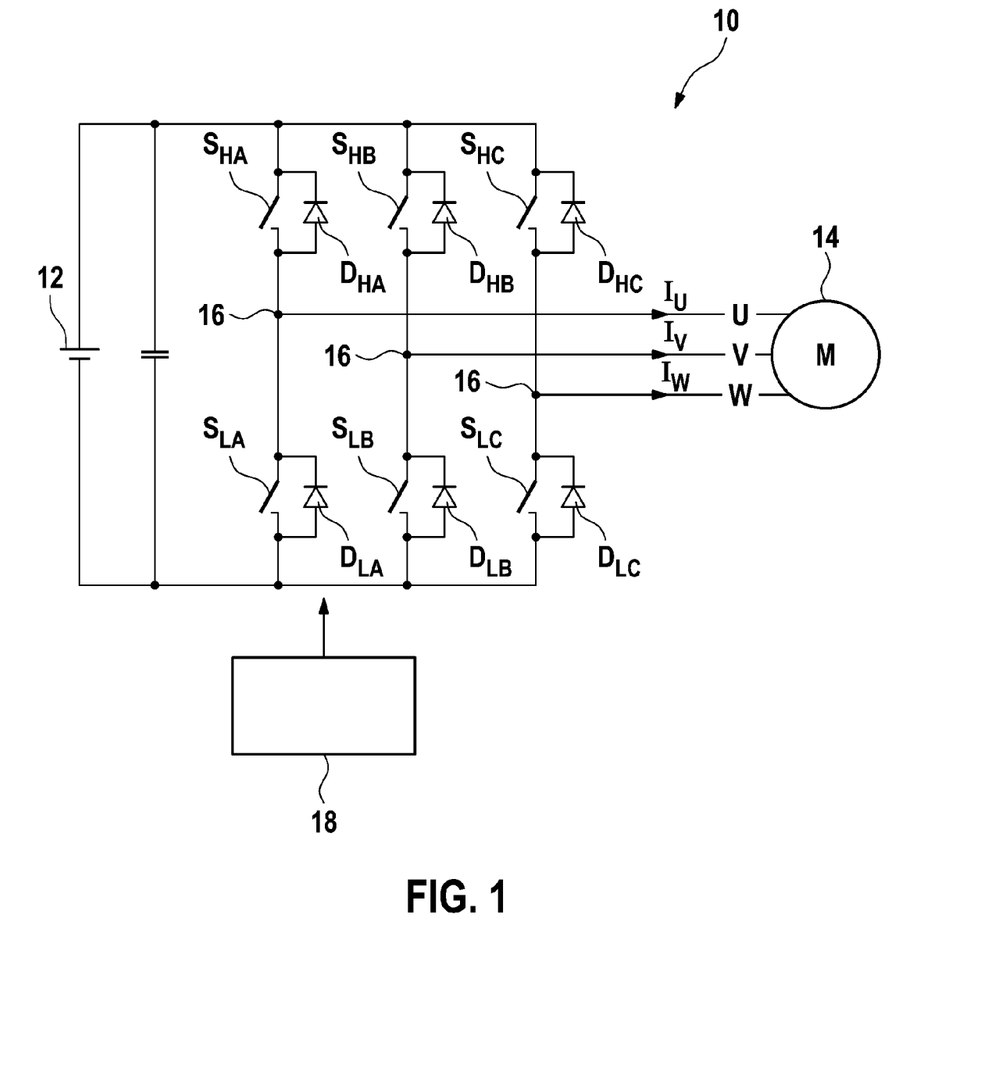
FIG. 1 shows an inverter for actuating an electric machine in schematic form.

In FIG. 1, the switches S are denoted according to the phase U, V, W which they provide and according to the arrangement at a high potential of the DC voltage source 12 or at a low potential of the DC voltage source 12 with SHA, SLA, SHB, SLB, SHC, SLC. The free-wheeling diodes are correspondingly denoted with DHA, DLA, DHB, DLB, DHC, DLC.

By alternately opening and closing the switches S, an actuating voltage is applied in each case between the phase conductors U, V, W so that correspondingly a phase current IU, IV, IW ensues in each case which drives the electrical machine 14. The inverter 10 is preferably formed by means of semiconductors. The switches of the inverter are alternately opened and closed by means of a schematically depicted control unit 18 in order to provide the phase voltages with a certain profile and to provide a voltage space vector and to respectively energize the electrical machine 14 with the phase currents IU, IV, IW. In so doing, the voltage vector is provided by the inverter 10, whereupon the current space vector correspondingly ensues as a function of the actuated load.

Figure 2:
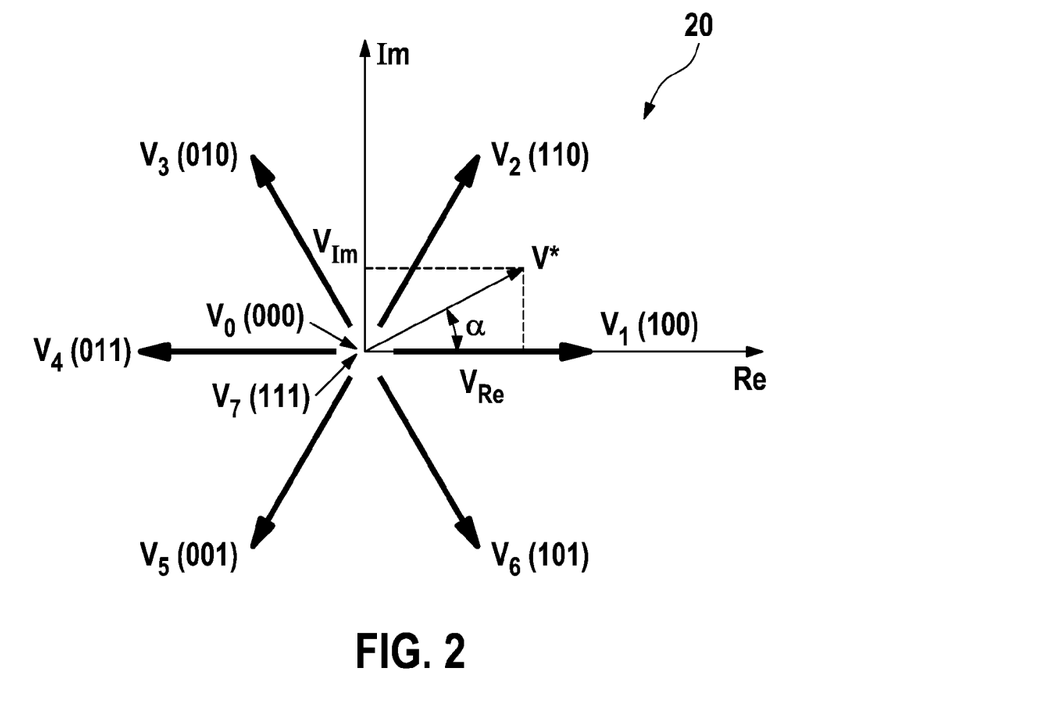
FIG. 2 shows a complex vector diagram for illustrating a space vector modulation method for actuating an inverter.

In FIG. 2, a complex vector diagram is depicted for the purpose of illustrating the space vector modulation for actuating the three-phase consumer 14 or, respectively, the electrical machine 14 and is generally denoted with the reference numeral 20.

In the vector diagram 20, a voltage vector V* of the electric machine 14 having an actuation angle Alpha is depicted. In the vector diagram 20, six base voltage vectors V1, V2, V3, V4, V5, V6 are additionally depicted which result if individual switches or two of the switches S of the inverter 10 are closed and the electrical machine is accordingly actuated. In order to set the voltage vector V* with a maximum length, which in this example has the actuation angle Alpha between the base voltage vectors Viand V2, said voltage vector is implemented by alternately actuating the inverter 10 in accordance with the base voltage vector V1 and the base voltage vector V2. The two base voltage vectors V1, V2 are alternately set having a predefined switching frequency, so that the voltage vector V* having a phase angle of 30 degrees results with the same duty cycle of the base voltage vectors V1, V2. If a voltage vector V* having a larger actuation angle Alpha has to be set, the duty cycle of the base voltage vector V2 is correspondingly extended and the duty cycle of the base voltage vector V1 is shortened. Thus, the voltage space vector V* having an arbitrary actuation angle Alpha can be implemented by means of a clocked actuation of the switches S of the inverter 10.

Provided the voltage vector V* is to be set having a smaller absolute value (shorter length) than the base voltage space vectors V1, V2 as in the case depicted in FIG. 2, a zero voltage vector V0, V7 is correspondingly set, whereat the switches SHA, SHB, SHC on the upper side or SLA, SLB, SLC on the lower side of the inverter 10 are open. The respective other switches S are accordingly closed. The voltage vector V* can accordingly be implemented by means of a combination of the base voltage space vectors V1 and V2 and one of the zero voltage vectors V0, V7.

In order to pass current through the electrical consumer 14 or, respectively, the electrical machine 14, the voltage space vector V* is provided by the different base voltage space vectors V1-V6 being set consecutively in a rapid succession. As a result, the different switches S and the different free-wheeling diodes D of the inverter 10 are evenly loaded when the voltage space vector V* is rotating correspondingly fast, in particular more evenly loaded phase-wise. Provided the rotational frequency of the voltage space vector V* is very low or is zero, for example when the rotational speeds of the electrical machine 10 are low, the corresponding switches S and the free-wheeling diodes D of the inverter 10 of a phase U, V, W are loaded over a long period of time, so that an overloading of the corresponding switches S and the free-wheeling diodes D can occur, and said switches S and said free-wheeling diodes D of the inverter 10 can be generally unevenly loaded, in particular phase-wise unevenly load. In order to prevent an overloading of individual members of the switches S and individual members of the free-wheeling diodes D, measures must be taken to distribute the load onto various members of the switches S and the free-wheeling diodes D.

Figure 3:
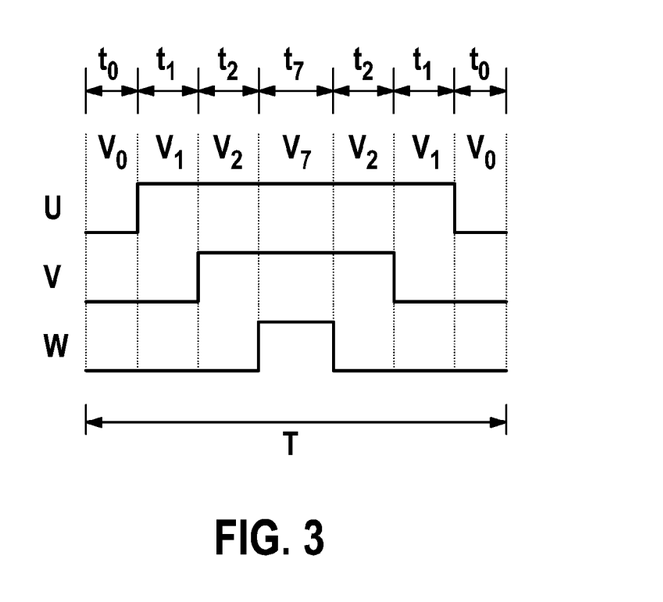
FIG. 3 shows, in schematic form, a profile of three phase voltages for setting different voltage space vectors.

In FIG. 3, profiles of the phase voltages of the three phases U, V, W within a pulse width modulation period T are depicted in order to successively set the base voltage space vectors V0, V1, V2, V7. A duty cycle t0, t1, t2, t7 of the individual base voltage space vectors V0, V1, V2, V7 can be varied within the pulse width modulation period T in order to be able to set the voltage space vector V* more precisely.

Due to the inertia of the controllable switches, a minimum temporal interval between two switching points in time of a switch must be maintained. Said minimum interval is necessary between switch-on times as well as between switch-off times. As a result of this inertia of the components, the adjustable operating range and a maximum phase control factor are reduced, said phase control factor being calculated by means of the formula:

$$A\_Max = (T - 2 * t\_Min)/T, \qquad (a)$$

wherein T is the pulse with modulation period duration and t_Min is the minimum interval between two switching points in time. Provided a switching sequence is required, the duration of which is less than 2*t_Min, said sequence cannot be set by the inverter 10. In order to nevertheless be able to set a corresponding voltage space vector V*, the voltage profiles or, respectively, the switching sequences have to varied so that the temporal interval between the switching states is greater than 2*t_M in.

Figure 4:
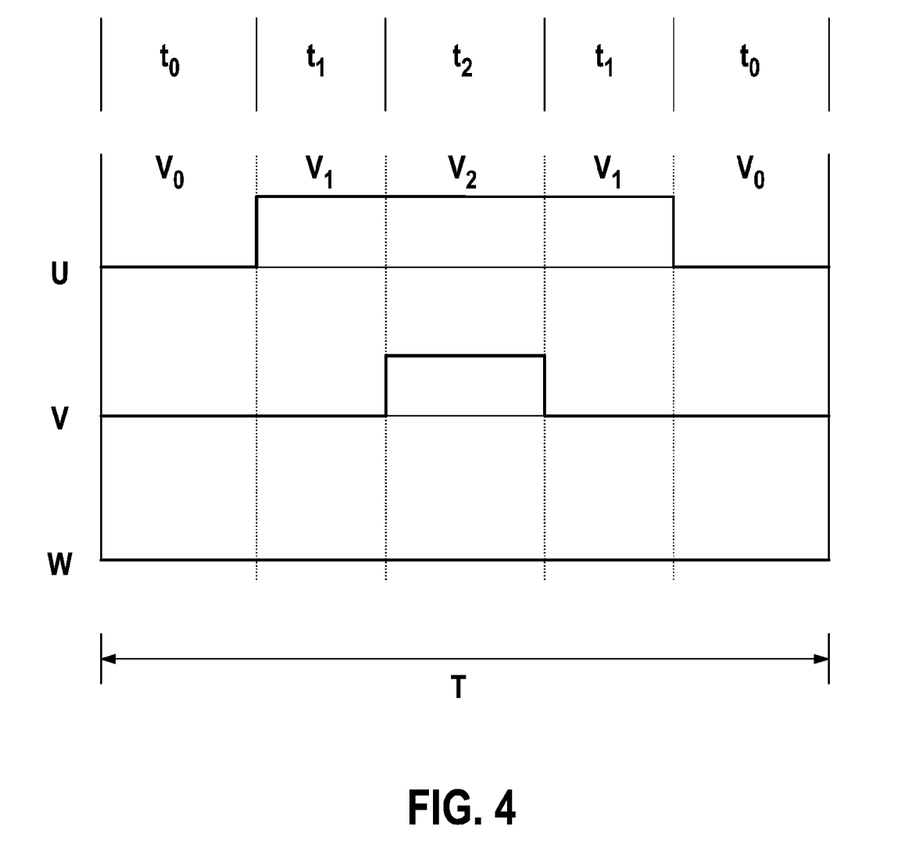
FIG. 4 shows, in schematic form, the profile of three phase voltages of a pulse width modulation period in which one of the controllable switches is permanently switched off.

In order to expand the operating range, a known method is to reduce the duty cycles $t_0$-$t_7$ of the controllable switches S and thereby not to switch on or, respectively, to leave one of the controllable switches switched off over the entire pulse width modulation period T, as is shown in FIG. 4.

In FIG. 4, three voltage profiles of the phases U, V, W are depicted within a pulse width modulation period T, which form a switching sequence of the switching states V0-V7 and set a voltage space vector V* which corresponds to the voltage space vector V* which is formed by the switching sequence from FIG. 3. In order to achieve the switching sequence from FIG. 4, the switch-on times of the controllable switches SHA, SHB, i.e. the phase voltages of the phases U, V, are shortened by the switch-on time t7 and the phase voltage of the phase W is set to zero over the entire pulse width modulation period T. In other words, all of the duty cycles of the controllable switches S are shortened by the switch-on time t7 of the switch S H C that is switched on for the shortest amount of time. In so doing, only the switch-on time of the zero voltage vector V7 is reduced to zero, and the zero voltage vector V0 is extended by the corresponding switch-on time t7. Because in this case only the zero voltage times V0, V7 are varied, an identical voltage space vector V* is set by means of the switching sequence from FIG. 4 as said voltage space vector is set by means of the switching sequence from FIG. 3. Provided the switch-on time t7 of the zero voltage vector V7 from FIG. 3 achieves the minimally admissible value, a corresponding voltage space vector V* is thereby set without an inadmissibly shortened pulse being set.

Figure 5:
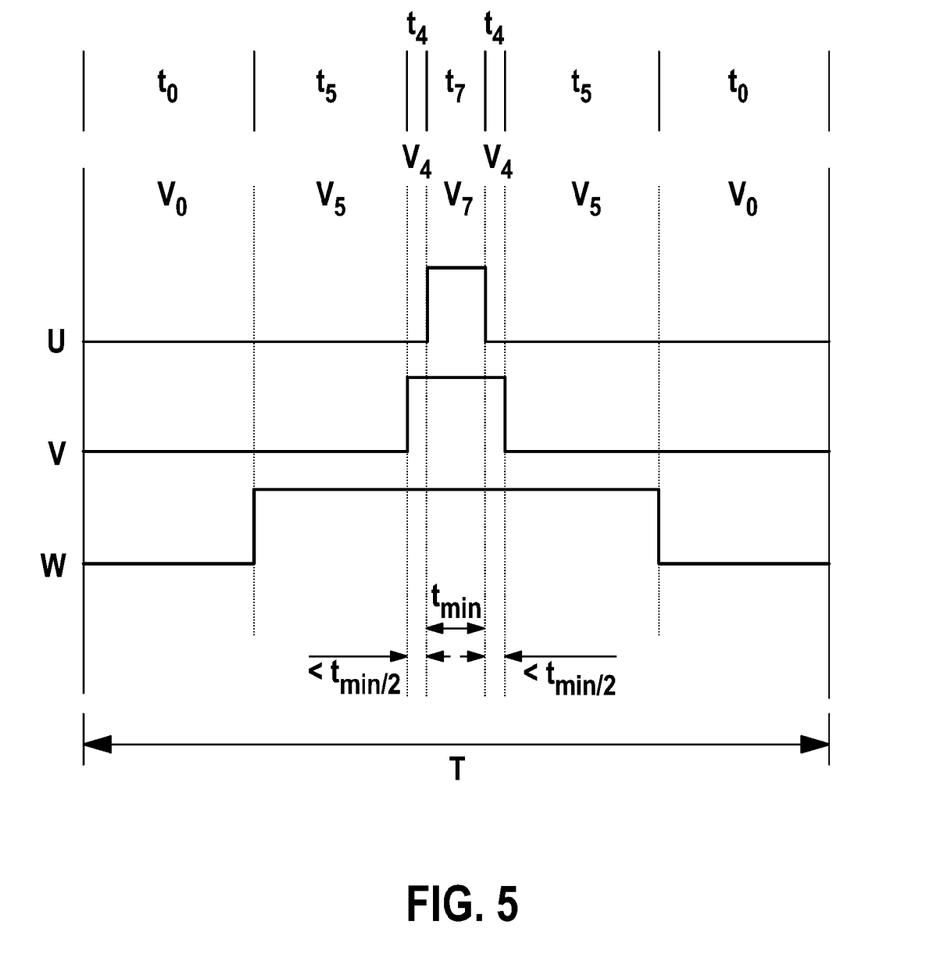
FIG. 5 shows, in schematic form, the profile of three phase voltages, with which a minimum phase control factor is achieved.

Three phase voltages of the phase conductors U, V, W are schematically depicted in FIG. 5, which shows a switching sequence comprising two intervals of two switching states that are as small as possible. In the switching sequence from FIG. 5, the duration of the switch-on time t4 is respectively t_Min/2 and the duration of the switch-on time t7 is exactly t_Min. Provided the duty cycles of the controllable switches S are shortened by the shortest switch-on time t7 for this switching sequence, a voltage pulse of the Phase V would be set which achieves the minimum possible interval between two switching processes of a switch. If the switch-on time t4 is further reduced, the minimum switch-on time t_Min is undershot so that the method for expanding the range by shortening the switch-on time, which is illustrated in FIG. 4, is not applicable here.

Figure 6:
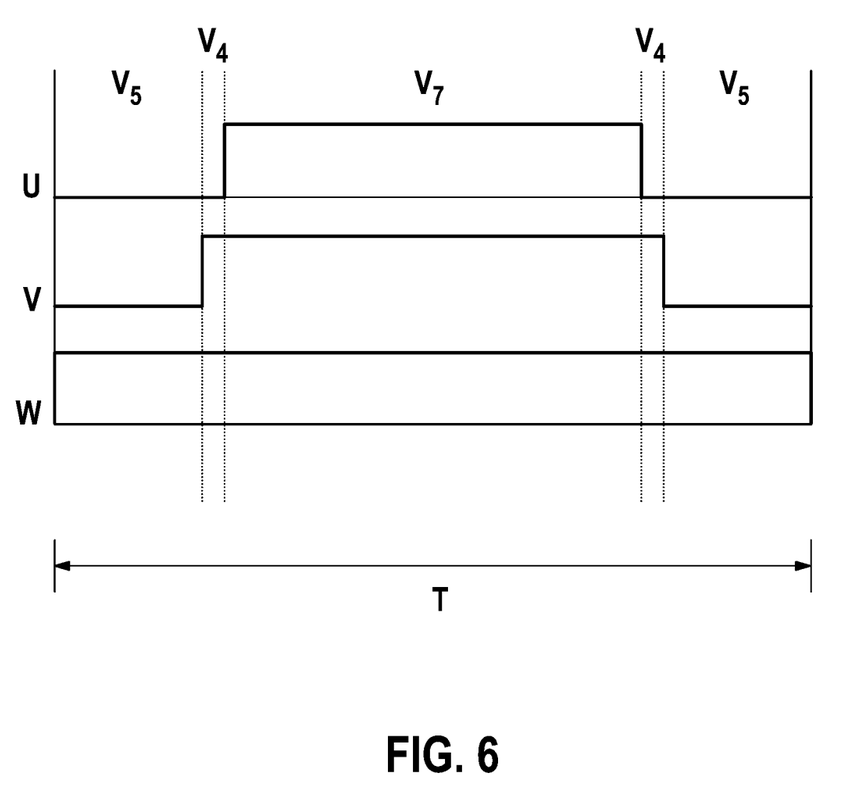

In FIG. 6, three phase voltages of the phases U, V, W are schematically depicted which provide the same voltage space vector V* as the switching sequence from FIG. 5. In order to prevent the inadmissible shortening of a voltage pulse, the switch-on time of the controllable switches S were, based on the voltage profiles from FIG. 5, extended by a time duration which is in each case identical, so that the duty cycle of the controllable switch SHC of the phase W is extended to the entire pulse width modulation period. In other words, the duration t0 of the switching state V0 is reduced to zero and the duty cycles of the controllable switches SHA and SHB are extended by 2*t0. In other words, the switch-on time of the zero voltage vector V7 is extended at the expense of the zero voltage vector V0. Thus, only one of the zero voltage vectors V0, V7 is used for the entire pulse width modulation period T. Because the zero voltage vectors V0, V7 have no influence on the voltage space vector V* provided, said voltage space vector V* is not affected. As a result of this extension of the switch-on times, the operating range of the inverter 10 can be extended and an inadmissibly short voltage pulse can be prevented from being set.

This method for extending the duty cycles of the controllable switches S is then preferably used if the duty factor of the controllable switch S having the median duty cycle of the switches S within a pulse width modulation period T is smaller than 50%. In other words, that is if two of the switches S have a duty factor of less than 50%. Provided the duty factor of the switch S having the median duty cycle of the switches S within a pulse width modulation period T is greater than 50%, i.e. if two of the switches S have a duty factor greater than 50%, the duty cycles of the controllable switches S are preferably shortened as is shown in FIG. 4. As a result, the duty cycles can be varied accordingly depending on the switching sequence in order to increase the operating range of the inverter 10 without short voltage pulses being inadmissibly set.

Figure 7:
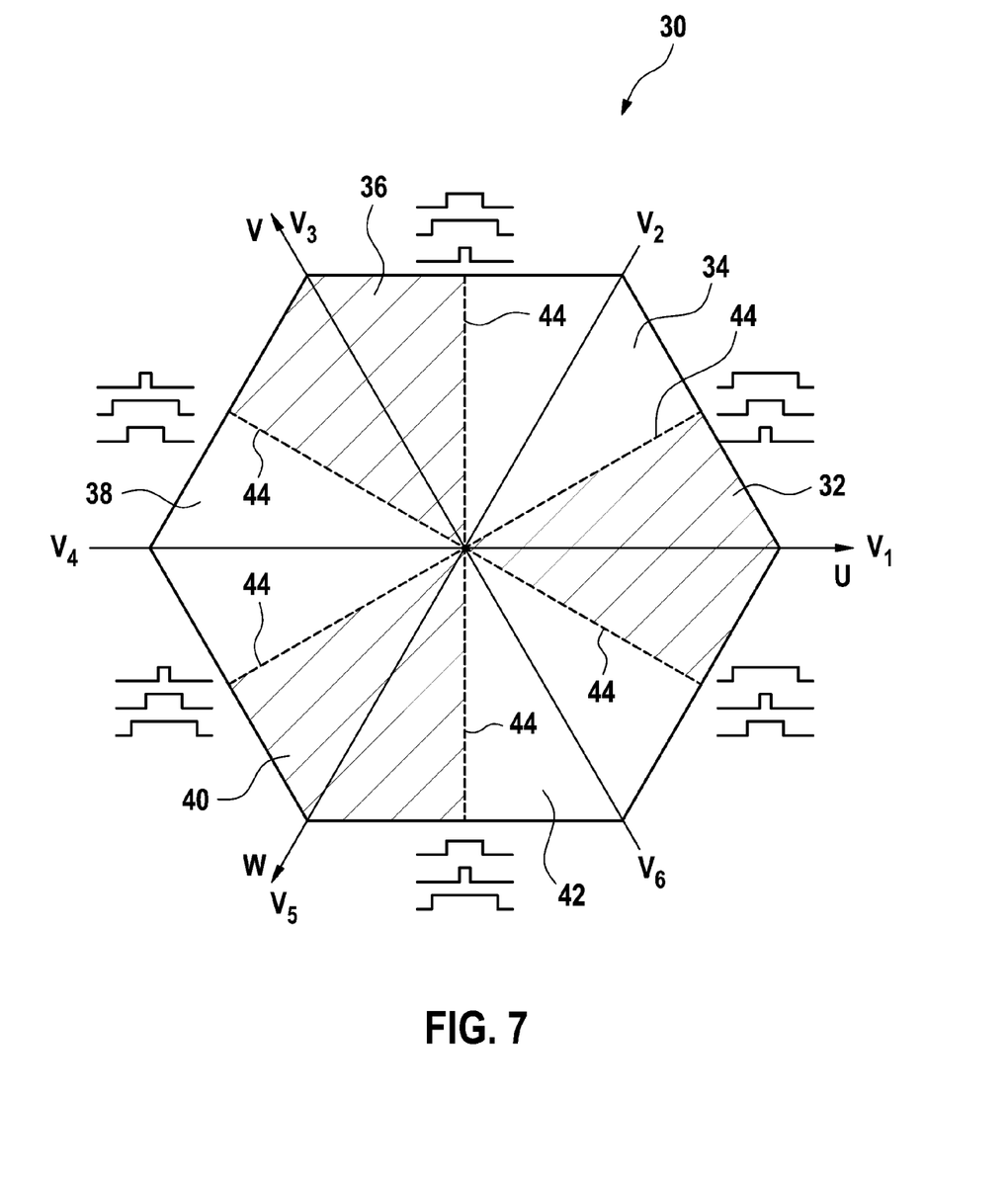
FIG. 7 shows, in schematic form, a complex vector diagram for illustrating different actuating areas of the space vector modulation.

In FIG. 7, a complex vector diagram comprising the three phase voltages U, V, W for actuating an electrical consumer are schematically depicted and universally denoted with the reference numeral 30.

The three phase voltages U, V, W span a hexagon with the positive and negative voltage vector thereof, wherein the positive phase voltages U, V, W correspond to the base voltage vectors V1, V3, V5 and the respective negative ends of the phase voltages U, V, W to the base voltages V2, V4, V6 from FIG. 2.

The complex vector diagram 30 is divided up into six different actuating regions 32, 34, 36, 38, 40, 42 which are respectively formed around one of the base voltage vectors V1-V6. In the actuating regions 32, 36, 40 which are formed around the positive phase voltages U, V, W or, respectively, around the base voltage vectors V1, V3, V5, the switch-on time of one of the controllable switches or one of the duty factors of the controllable switches S is very short, whereas the two other switch-on times or duty factors are relatively long. In the actuating regions 34, 38, 42 which are formed around the negative phase voltages U, V, W or, respectively, around the base voltage vectors V2, V4, V6, a switch-on time of a controllable switch S or, respectively, the duty factor of one of the controllable switches S is relatively long, whereas the two other switch-on times or, respectively, duty factors are relatively short.

As already mentioned above, it is disadvantageous to shorten the duty cycles of the controllable switches if the duty cycles of two of the controllable switches S are relatively short. It is furthermore disadvantageous to extend the duty cycles of the switches S if the duty cycles of two of the controllable switches S are relatively long. In this case voltage pulses would be set under certain circumstances which lie below the admissible pulse width. In other words, it is advantageous if the duty cycles of the controllable switches S are extended, provided two of the controllable switches S have a relatively short duty cycle or, respectively, a low duty factor; and it is advantageous to shorten the duty cycles of the controllable switches S, provided that two of the controllable switches have a duty cycle S or a large duty factor.

For that reason, the duty cycles of the controllable switches S for voltage space vectors V* are extended in the actuating regions 32, 36, 40 and shortened in the actuating regions 34, 38, 42.

The respective actuating regions 32-42 are separated from one another by respectively one threshold 44. The threshold forms a boundary, whereat the duty factor of the controllable switch having the median duty cycle of the switches S within a pulse width modulation period T is 50%. The process therefore switches between the actuating methods, i.e. the shortening or extending of the duty cycles of the switches S, provided that the median duty factor of all the duty factors is less than or greater than 50%.

If the median duty factor of all of the duty factors is exactly 50%, one of the two control methods is preferably arbitrarily selected.

Figure 8A:
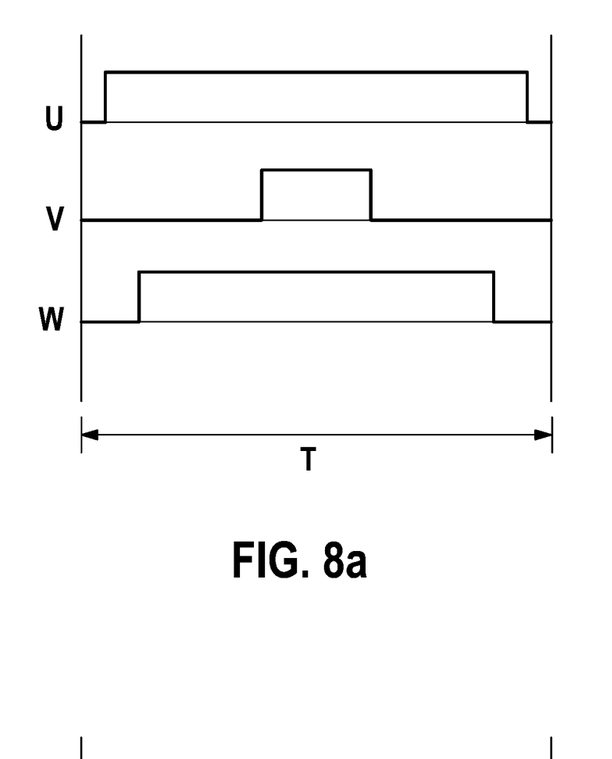
FIG. 8a,b shows, in schematic form, three phase voltages within a pulse width modulation period, having a median duty factor greater than 50%.
Figure 8B:
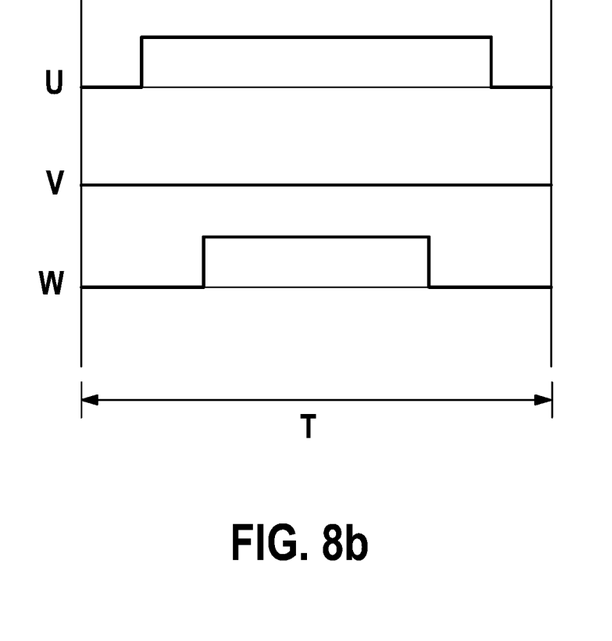

In FIG. 8a, b, an actuating sequence is schematically depicted in which the median duty factor is greater than 50% and the duty cycles of the controllable switches S or, respectively, the duty factor of the controllable switches S are correspondingly shortened. This actuating sequence depicted in FIG. 8a corresponds to the actuating regions 34, 38, 42, so that the duty cycles of the switches S or, respectively, the duty factors are shortened by the duty cycle of the switch SHB which has the shortest duty cycle. As a result, an actuating sequence occurs as is shown in FIG. 8b, wherein the phase voltages of the phases U, W are correspondingly shortened and the phase voltage of the phase V is reduced to zero.

Figure 9A:
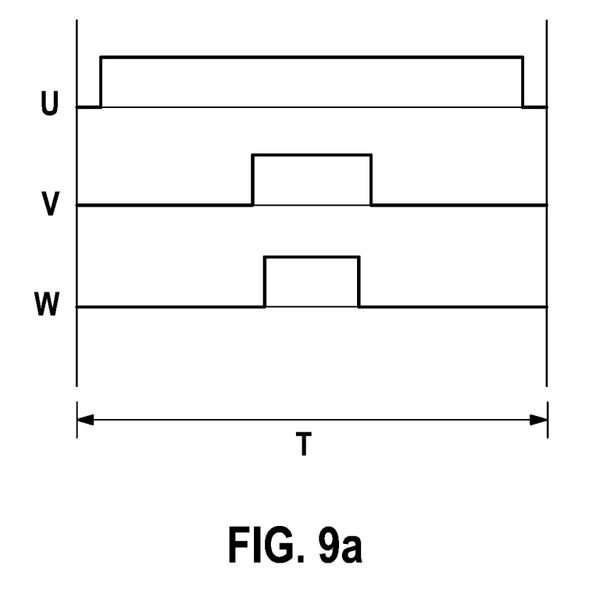
FIG. 9a,b shows, in schematic form, three phase voltages within a pulse width modulation period, having a median duty factor of less than 50%.
Figure 9B:
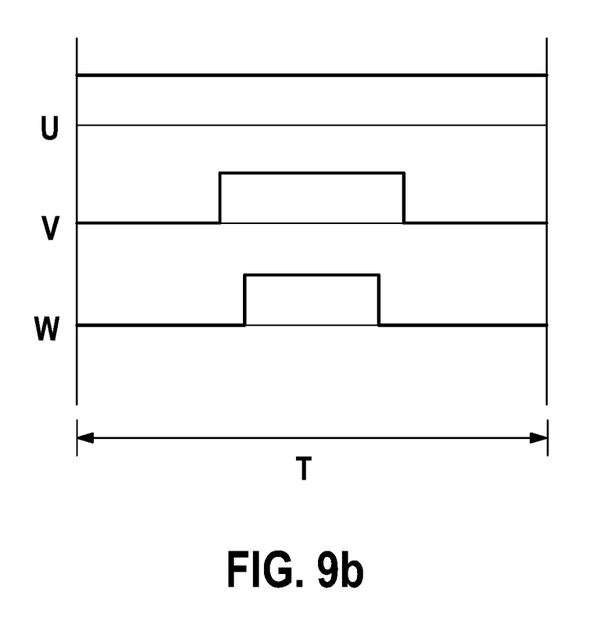

In FIG. 9a, an actuating sequence is shown in which the median duty factor of all of the duty factors is less than 50%. This actuating sequence therefore corresponds to one of the actuating regions 32, 36, 40. In order to prevent inadmissibly shortened voltage pulses, the duty cycles of the controllable switches S are extended during this actuating sequence; and in fact in such a manner that the switch having the longest duty cycle or, respectively, having the largest duty factor, in this case the controllable switch SHA of the phase U, is extended such that said switch is switched on over the entire pulse width modulation period T. The duty cycles of the other two controllable switches S are extended accordingly by the same time duration. As a result of this extension of the duty cycles, the actuating sequence occurs as depicted in FIG. 9b.

In FIGS. 8a, b and 9a, the phase voltages or the voltage pulses of the phase voltages are configured in such a manner that the inverter 10 is actuated with a zero voltage vector V0, V7 at the beginning and at the end of each of the pulse width modulation periods T. In FIG. 9b, the pulse width modulation period T begins with the base voltage space vector V1 and ends likewise with the base voltage space vector V1 due to the extension of the phase voltage U to the entire length of said pulse width modulation period T. In order to have each of the pulse width modulation periods T begin and end with a zero voltage vector V0, V7, the phase voltages V, W or, respectively, the voltage pulses of the phase voltages V, W have to be changed as is explained in detail below.

Figure 10A:
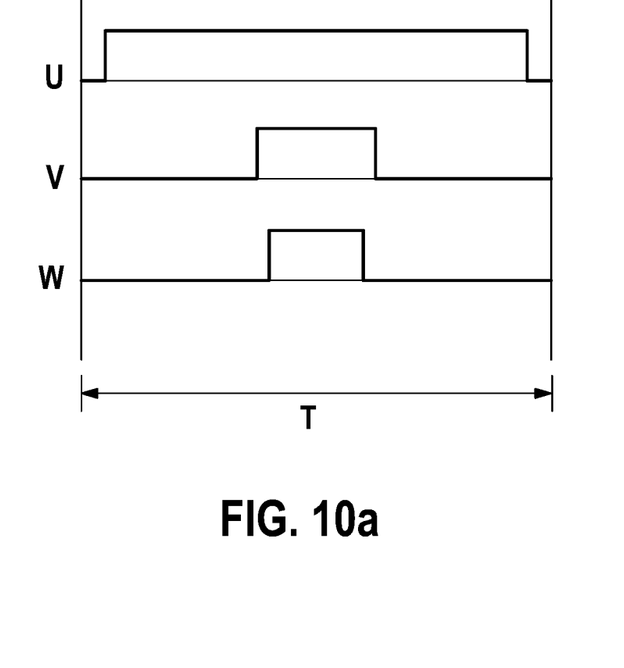
FIG. 10a,b shows, in schematic form, three phase voltages within a pulse width modulation period, in which voltages the voltage pulses are displaced to the beginning and to the end of the pulse width modulation period.

In FIG. 10a, an actuating sequence is shown which corresponds to the actuating sequence from FIG. 9a. As in the exemplary embodiment from FIG. 9a, the voltage pulses of the three phase voltages U, V, W are extended in this actuating situation so that the switch having the longest duty cycle or, respectively, having the largest duty factor, in this case the controllable switch SHA of the phase U, is extended such that said switch is switched on over the entire pulse width modulation period T. The duty cycles of the other two controllable switches S are extended accordingly by the same time duration.

Figure 10B:
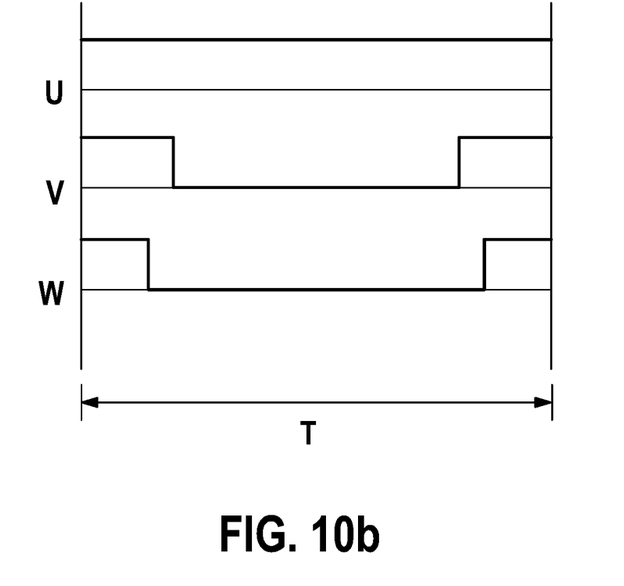

A variation of the voltage pulses of the phase voltages V, W is depicted in FIG. 10b. The voltage pulses are thereby arranged such that the pulse width modulation period T begins and ends in each case with a zero voltage vector V0, V7. In so doing, the resulting extended voltage pulses of the phase voltages V, W are divided and the resulting partial voltage pulses are displaced to the beginning or the end of the pulse width modulation period T.

As a result, the zero voltage vector V7 is activated at the beginning of the pulse width modulation period T and likewise at the end of said pulse width modulation period T. Because, in principle, only the zero voltage vectors V0, V7 are displaced from the middle of the pulse width modulation period T to the margins thereof, the actuation of the electrical consumer 14 or the voltage space vector V* is not affected.

Figure 11A:
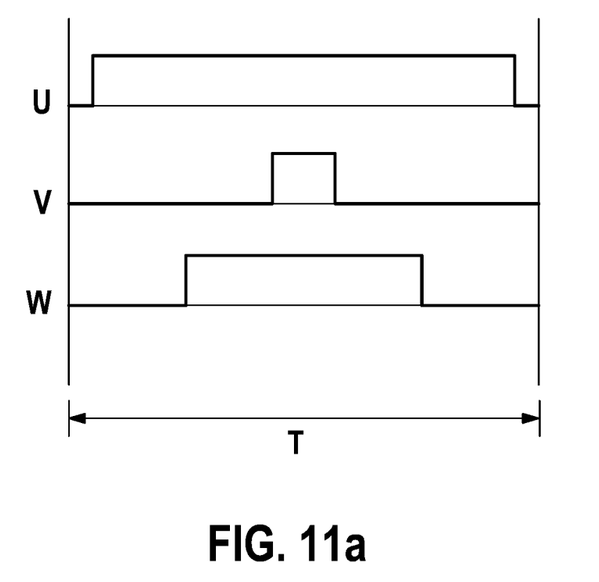
FIG. 11a,b shows, in schematic form, three phase voltages within a pulse width modulation period in a transition region of the actuation of the inverter.

Phase voltages of the phases U, V, W are depicted in FIG. 11a, the median duty factor being 50%. This sequence forms a transition from one of the actuating regions 34, 38, 42 to one of the actuating regions 32, 36, 40. This actuating sequence therefore forms a transition between a region in which one of the switches S is closed over the entire pulse width modulation period T to a region in which one of the controllable switches S is open over the entire pulse width modulation period T. In order to prevent inadmissible shortenings of the voltage pulses in this transition region, the switch-on pulses of the three phases U, V, W or, respectively, of the controllable switches S are postponed within the pulse width modulation period T, so that inadmissibly shortened voltage pulses are prevented. Such a postponement of the voltage pulses is shown in FIG. 11b.

Figure 12A:
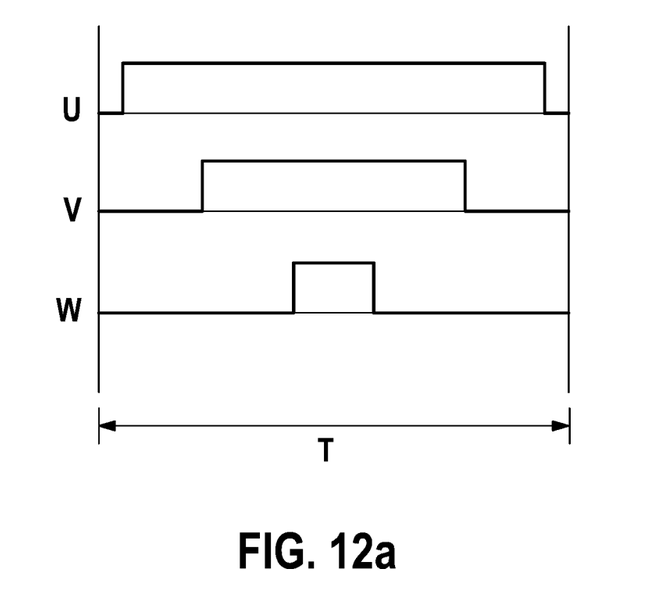
FIG. 12a,b shows, in schematic form, the profile of three phase voltages within a pulse width modulation period in a transition region between two actuating modes of the inverter.

In contrast thereto, the voltage pulses are temporally displaced forward or shifted to the beginning of the pulse width modulation period T during a transition from one of the actuating regions 32, 36, 40 to one of the actuating regions 34, 38, 42 within said pulse width modulation period T, i.e from an extension of the switch-on times as shown in FIG. 9a to a shortening of the switch-on times as shown in FIG. 8a, b. Such a transition sequence is shown in FIG. 12a and an actuating sequence in which the corresponding voltage pulses are shifted to the beginning of the pulse width modulation period T is shown in FIG. 12b.

In this way, the adjustable operating range of the inverter 10 can be expanded and inadmissibly shortened voltage pulses can be avoided.

Figure 11B:
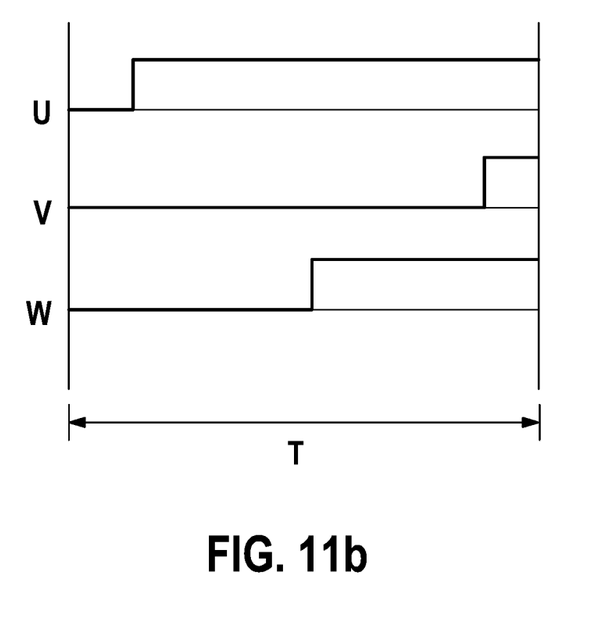
Figure 12B:
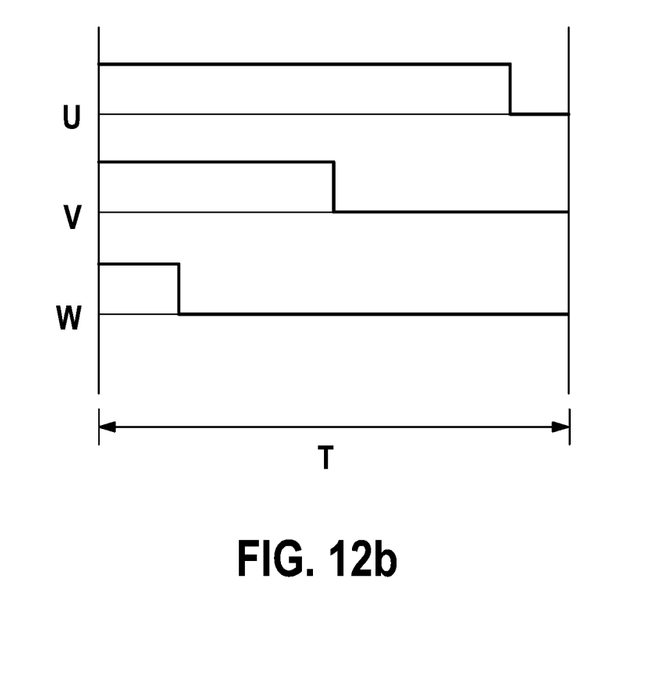

In the sequences from FIGS. 11b and 12b, the pulse width modulation period T begins in each case with one of the zero voltage vectors V0, V7 and ends with the respective other of the zero voltage vectors V0, V7.

The invention claimed is:

1. A method for actuating an inverter, the method comprising:
receiving an actuating sequence by means of space vector pulse width modulation;
actuating a plurality of controllable switches based on the actuating sequence so that different duty cycles of the switches are set and a plurality of successive different switching states of the switches are set up to provide the voltage space vector, wherein the duty cycles of the plurality of controllable switches are extended during a pulse width modulation period if a duty cycle of one of the switches falls below a predefined threshold-during the pulse width modulation period; and
providing a multi-phase electrical voltage in the form of a voltage space vector by the plurality of controllable switches.

2. The method according to claim 1, wherein the duty cycle of the switch used has a median duty cycle of the plurality of controllable switches.

3. The method according to claim 1, wherein the duty cycles of the plurality of controllable switches that are switched on are extended by a time duration which is identical in each case.

4. The method according to claim 1, wherein the duty cycle of the switch having the longest duty cycle within the pulse width modulation period is extended in such a manner that the switch is switched on over the entire pulse width modulation period.

5. The method according to claim 1, wherein the time duration by which the duty cycles of the plurality of controllable switches are extended corresponds to the difference between the pulse width modulation period duration and the duty cycle of the switch having the longest duty cycle.

6. The method according to claim 1, wherein the duty cycle of the switch is a duty factor of the switch and the predefined threshold is a duty factor of 50%.

7. The method according to claim 1, wherein the duty cycles of the plurality of controllable switches are shortened if the duty cycle of the switch exceeds a second predefined threshold.

8. The method according to claim 7, wherein the duty cycles of the plurality of controllable switches are shortened by respectively one identical time duration such that the switch-having the shortest duty cycle is open over the entire pulse width modulation period.

9. The method according to claim 1, wherein the respective switch-on pulses of the plurality of controllable switches are displaced within the pulse width modulation period if the duty cycle of the switch corresponds to a predefined range of values between the first and the second threshold.

10. The method according to claim 9, wherein the first and the second threshold are identical.

11. The method according to claim 9, wherein the switch-on pulses of the plurality of controllable switches are displaced to one end of the pulse width modulation period if the duty cycle is changed from a value greater than the first threshold to a value less than the second threshold.

12. The method according to claim 10, wherein the switch-on pulses of the plurality of controllable switches are displaced to the beginning of the pulse width modulation period if the duty cycle of the switch is changed from a value less than the second threshold to a value greater than the second threshold.

13. The method according to claim 1, wherein the switch-on pulses of the respective switches are divided and the divided switch-on pulses are in each case displaced to the beginning and to the end of the pulse width modulation period.

14. A device for actuating an inverter, the device comprising:
- a controller configured to actuate a plurality of controllable switches in the inverter so that different duty cycles of the switches are set and the inverter assumes a plurality of successive different switching states of the switches in order to provide the voltage space vector, wherein the controller is configured to extend the duty cycles of the switches during a pulse width modulation period if a duty cycle of one of the switches falls below a predefined threshold during the pulse width modulation period;
- wherein the plurality of controllable switches are actuated by means of space vector pulse width modulation; and
- wherein the plurality of controllable switches are configured to provide a multi-phase electrical voltage in the form of a voltage space vector.

15. A motor vehicle drive train comprising at least one electrical machine for providing driving power, an inverter for actuating the electrical machine and a device for actuating the inverter according to claim 14.

* * * * *